(12) United States Patent
Stiglic et al.

(10) Patent No.: US 10,853,593 B2
(45) Date of Patent: Dec. 1, 2020

(54) INTEGRATED CIRCUITS AND METHODS FOR PROTOCOL DETECTION AND DECODING IN NEAR FIELD COMMUNICATIONS

(71) Applicant: STMicroelectronics razvoj polprevodnikov d.o.o., Ljubljana (SI)

(72) Inventors: Maksimiljan Stiglic, Maribor (SI); Iztok Bratuz, Ankaran (SI); Albin Pevec, Ljubljana (SI); Roman Benkovic, Ljubljana (SI)

(73) Assignee: STMICROELECTRONICS RAZVOJ POLPREVODNIKOV D.O.O., Ljubljana (SI)

( * ) Notice: Subject to any disclaimer, the term of this patent is extended or adjusted under 35 U.S.C. 154(b) by 0 days.

(21) Appl. No.: 16/443,227

(22) Filed: Jun. 17, 2019

(65) Prior Publication Data
US 2019/0384951 A1 Dec. 19, 2019

(30) Foreign Application Priority Data
Jun. 19, 2018 (EP) .................................... 18178584

(51) Int. Cl.
| | |
|---|---|
| G06K 7/10 | (2006.01) |
| H04B 5/00 | (2006.01) |
| G06F 1/08 | (2006.01) |
| H04L 27/20 | (2006.01) |
| H04L 27/22 | (2006.01) |

(52) U.S. Cl.
CPC .......... *G06K 7/10297* (2013.01); *G06F 1/08* (2013.01); *H04B 5/0075* (2013.01); *H04L 27/20* (2013.01); *H04L 27/22* (2013.01)

(58) Field of Classification Search
CPC .......... G06K 7/10297; G06K 7/10138; G06K 19/0712; G06K 19/072; G06K 19/0721; G06K 19/0723; G06K 19/0725; G06K 19/07766; G06K 19/07767; H04B 5/0075; H04L 27/20; H04L 27/22; G06F 1/08
USPC .......... 340/13.24, 13.26, 12.15, 10, 1, 10.3; 375/320, 333
See application file for complete search history.

(56) References Cited

U.S. PATENT DOCUMENTS

| | | | |
|---|---|---|---|
| 2001/0035816 A1* | 11/2001 | Beigel ................ | G06K 7/10297 340/10.42 |
| 2001/0050922 A1* | 12/2001 | Tiernay .................. | G08G 1/017 370/467 |
| 2005/0056704 A1* | 3/2005 | Kim ..................... | G06K 7/0008 235/492 |
| 2006/0186995 A1* | 8/2006 | Wu ...................... | G06K 7/0008 340/10.1 |
| 2009/0322484 A1* | 12/2009 | Toriyama ........... | G06K 19/0723 340/10.1 |

(Continued)

FOREIGN PATENT DOCUMENTS

EP 3107208 A1 12/2016

*Primary Examiner* — Edwin C Holloway, III
(74) *Attorney, Agent, or Firm* — Slater Matsil, LLP

(57) ABSTRACT

A method for decoding a data stream carried by a modulated signal includes receiving the modulated signal. The modulated signal is modulated according to a protocol belonging to a group of protocols including at least three protocols. The method further includes extracting a clock signal from the received modulated signal, detecting the protocol, and decoding the data stream according to the detected protocol using the extracted clock signal.

23 Claims, 3 Drawing Sheets

(56) References Cited

U.S. PATENT DOCUMENTS

| | | | |
|---|---|---|---|
| 2010/0124258 A1* | 5/2010 | Sekiguchi | G06K 7/0008 375/219 |
| 2011/0206142 A1* | 8/2011 | Sung | H04B 5/0031 375/259 |
| 2015/0347892 A1* | 12/2015 | Kunc | G06K 19/0705 340/10.4 |
| 2016/0182263 A1 | 6/2016 | Ramakrishnan | |
| 2016/0198477 A1* | 7/2016 | Takagi | G06K 19/0723 370/329 |
| 2017/0053141 A1 | 2/2017 | Bancel et al. | |

* cited by examiner

INTEGRATED CIRCUITS AND METHODS FOR PROTOCOL DETECTION AND DECODING IN NEAR FIELD COMMUNICATIONS

CROSS-REFERENCE TO RELATED APPLICATIONS

This application claims priority to European Patent Application No. 18178584.1, filed on Jun. 19, 2018, which application is hereby incorporated herein by reference in its entirety.

TECHNICAL FIELD

The present invention relates generally to protocol detection and decoding in the field of wireless communication, and, in particular embodiments, to integrated circuits and methods for protocol detection and decoding in near field communications (NFC).

BACKGROUND

Embodiments of the present invention are related to the field of wireless communication, especially near field communication (NFC) and, more particularly to detecting and decoding at a multiprotocol transponder or tag, the protocol used by a reader communicating with said transponder or tag.

Near field communication (NFC) is a set of standards for wireless apparatuses, in particular smartphones and similar devices, utilized to establish radio communication between two devices by touching them together or bringing them into proximity, typically at a distance of 10 cm or less.

NFC uses electromagnetic induction between two loop antennas located within each other's near field, effectively forming an air-core transformer. It operates for example at 13.56 MHz. NFC involves an initiator and a target. The initiator or reader actively generates an RF field that can power a passive target, an unpowered chip called a transponder or "tag". This enables NFC targets to take simple form factors as stickers, key fobs, or cards that do not use batteries.

The communication from the reader to the tag is effected by amplitude modulation of a carrier signal by the reader, respecting some standards.

The tag may be passive or active. In the first case, the tag does not generate electromagnetic field, whereas in the second case it generates also an electromagnetic field, and the communication between the reader and the tag uses an Active Load Modulation (ALM).

NFC technology is standardized in ISO/IEC 18092, ISO/IEC 21481 and NFC FORUM documents but incorporates a variety of pre-existing standards including type A protocol and type B protocol which are standardized in ISO/IEC 14443.

Type A protocol, also known as ISO 14443A and NFC-A technology, is based on On Off Keying—OOK—modulation using modified Miller pulse position. The start of frame, called SOF symbol, is composed of one pulse only. The end of frame, EOF is marked by a non-modulated period.

Type B protocol, also known as ISO 14443B and NFC forum NFC-B technology, is based on Amplitude-Shift Keying—ASK—modulation and employs direct bit coding. The SOF symbol comprises ten to eleven low bits followed by two to three high bits. The EOF is represented by some low bits.

FeliCa protocol, also called NFC-F technology, is standardized in JIS.X.6319 and based on ASK modulation and is quite different. The data is Manchester coded on a sub-carrier clock of 212 kHz or 424 kHz. The SOF has a train of 48 or more unmodulated sub-carrier clocks. Beginning of data is marked by a first change in phase of the sub-carrier. EOF is signaled by the data.

Due to different amplitude modulation indexes, two demodulators of different structure are usually employed in known solutions: OOK and ASK demodulators.

If type B or type F protocol is detected, a usual approach to decode data sent to the tag, by type B or type F decoder, is a clock signal which has a proportional frequency to reader carrier signal frequency. Said clock signal is generated by a clock extractor which is coupled to the tag antenna coil.

However, the clock signal frequency wouldn't be proportional to reader carrier signal frequency in case type A protocol has been detected. Therefore, the clock signal cannot be used as a clock to type A decoder. An oscillator which generates a clock signal is used instead.

The disadvantage of using this concept is that the oscillator leads to an increase in cost of the implementation. It also needs to be tested which increases testing time.

SUMMARY

Embodiments of the invention propose an architecture that uses only the clock signal extracted from the reader field to decode data received by the tag, whatever the protocol A, B or F detected. Embodiments propose a solution that permits to reduce the cost of implementation of a multiprotocol detection within a tag.

In a first aspect, a method is proposed for decoding a data stream carried by a modulated signal. The signal is modulated according to one protocol belonging to the group including protocols A and B of ISO/IEC14443 standard and protocol F of JIS.X.6319 standard. The method comprises receiving the modulated signal, detecting the protocol and decoding the data stream in accordance with the protocol using a clock signal.

According to this aspect, whatever the detected protocol, the clock signal is a clock signal extracted from the received modulated signal. For example, only the extracted clock signal is used to decode the data stream whatever the detected protocol.

According to one embodiment, detecting the protocol comprises performing on the modulated signal an Amplitude Shift Keying—ASK—demodulation to provide a first signal and an On Off Keying—OOK—demodulation to provide a second signal.

The first signal has transitions between a first state, for example "1" and a second state, for example "0", if the modulated signal is modulated according to the protocol A, B or F.

The second signal has transitions between the first state and the second state if the modulated signal is modulated according to the protocol A or eventually according to the protocol F.

The protocol is detected from both first and second signals.

The ASK demodulation is thus performed by an ASK demodulator. The ASK demodulator comprises for example a comparator which has a first reference voltage set so high, for example 95% of non-modulated level, that it can detect a modulation according to the three protocols A, B and F.

On the other hand, the OOK demodulation is performed by an OOK demodulator. The OOK demodulator comprises for example a comparator which has a reference voltage set low to only detect type A protocol. But, sometimes, OOK demodulator can also detect type F protocol when the modulation according to Type F protocol is deep.

More precisely, maximum modulation index of Type F according to standard specification is 30%. At such modulating index, the modulated level is at 54% of non-modulated level. But, there are some installed readers where the modulation level is even lower for example 50% of non-modulated level. 50% is also a typical threshold of OOK demodulator in protocol detection mode which means that OOK demodulator can also detect Type F protocol.

In an embodiment, the second signal has the first state if the level of the modulated signal is greater than a first threshold and has the second state if the level of the modulated signal is lower than a second threshold, and detecting the protocol comprises stopping the clock signal if the second signal has the second state, i.e. when the OOK demodulator detects a modulation which can be either of type A or type F protocol, and not stopping the clock signal during the reception of a non-modulated signal.

For example, the first threshold is about 50% of non-modulated level and the second threshold varies to stay above the level of the modulated signal even if the level goes to zero. The second threshold helps to detect quickly the rising edge of the modulated signal.

The first and second threshold are typically implemented in the OOK demodulator.

If OOK demodulator detects type A or type F protocol, the clock signal may be forced to a constant value, for example zero. Once the protocol is recognized, the clock remains stopped in case the protocol is type A, but in case it's a type F protocol, the clock signal is no longer stopped.

The clock signal is also never stopped during the reception of a non-modulated signal, for example during two consecutive modulated pulses.

As the clock signal is stopped when an OOK modulation is detected, detecting the protocol among protocols A and F comprises advantageously determining the duration of the non-modulated signal.

In other words, when the clock signal is stopped, protocols A and F can be distinguished by determining the duration of the non-modulated signal which isn't the same for both protocols. For example, the duration of the non-modulated signal for type A protocol when the first data bit is 0 at rate 106 kbps is about 96/fc (fc for Carrier Frequency) and the duration of the non-modulated signal for type F protocol at rate 212 kbps is about 32/fc.

If an OOK modulation is detected by the OOK demodulator and the clock signal stopped, the determination of the duration to distinguish between A and F protocol, which needs the use of a clock signal may be done once the tag receives an non-modulated signal.

Detecting protocol B or F may also comprise analyzing the first signal.

As ASK demodulators can detect A, B and F protocols. B and F protocols can be distinguished by analyzing the first signal which is the output signal of ASK demodulator. This can be done by detecting Type F preamble and Type B SOF.

As indicated above, if the second signal has the second state and F protocol has been detected, the clock signal may be no longer stopped.

In other words, if OOK demodulator which is configured to detect Type A protocol, detects type F protocol, the clock signal is no longer stopped because the clock signal frequency is proportional to the frequency of the signal induced on the antenna coil tag.

In an embodiment, decoding the data stream comprises using one decoder among three decoders respectively intended to decode the data stream modulated according to protocols A, B and F, and before detecting the protocol, the decoder intended to decode data stream modulated according to protocol A is already activated.

In an embodiment, if protocol A is detected, the clock signal is stopped during reception of modulated pulses of the modulated signal, the second signal corresponding to the modulated pulses is memorized and the corresponding decoder will decode the data stream, only during the reception of the non-modulated signal based on the memorized second signal.

The second signal is memorized for example by a flip-flop or a latch until the clock signal reappears during the reception of the non-modulated signal.

According to another embodiment, decoding the data stream modulated according to a detected protocol comprises activating the corresponding decoder and disabling the other decoders.

If type A protocol is detected, type A decoder remains enabled and the other decoders may be kept disabled. If type B protocol is detected, type B decoder is enabled and the others decoders may be disabled and if type F protocol is detected, type F decoder is enabled and the others decoders may be disabled.

In another aspect, an integrated circuit is proposed for decoding a data stream carried by a modulated signal, the signal being modulated according to one protocol belonging to the group including protocols A and B of ISO/IEC14443 standard and protocol F of JIS.X.6319 standard. The integrated circuit comprises a receiver configured to receive the modulated signal, a detector configured to detect the protocol and a decoder configured to decode the data stream in accordance with the protocol using a clock signal. Whatever the detected protocol, the clock signal is a clock signal extracted from the received modulated signal.

According to one embodiment, the detector comprises an Amplitude Shift Keying—ASK—demodulator configured to perform an ASK demodulation on the modulated signal and to provide a first signal, and an On Off Keying—OOK—demodulator configured to perform an OOK demodulation on the modulated signal and to provide a second signal. The first signal has transitions between a first state and a second state if the modulated signal is modulated according to the protocol A, B or F and the second signal has transitions between the first state and the second state if the modulated signal is modulated according to the protocol A or eventually according to the protocol F. The detector is configured to detect the protocol from both first and second signals.

In an embodiment, the second signal has the first state if the level of the modulated signal is greater than a first threshold and has the second state if the level of the modulated signal is lower than a second threshold, and wherein the integrated circuit further comprises a blocking module coupled to the output of the OOK demodulator and configured to stop the clock signal if the second signal has the second state, and no longer stop the clock signal during the reception of a non-modulated signal.

The blocking module is configured to force the clock signal to a constant value, for example zero.

According to another embodiment, the detector is configured to detect the protocol among protocols A and F by determining the duration of the non-modulated signal.

In an embodiment, the detector is configured to detect protocols B and F by analyzing the first signal.

In an embodiment, if the second signal has the second state and detector detects F protocol, the blocking module is configured to no longer stop the clock signal.

According to another embodiment, the decoder comprises three decoders respectively intended to decode the data stream modulated according to protocols A, B and F, and the integrated circuit further comprises control means configured to activate decoder intended to decode data stream modulated according to protocol A before the detector detects the protocol.

In an embodiment, if detector detects A protocol, the blocking module is configured to stop the clock signal during reception of modulated pulses of the modulated signal. The integrated circuit comprises a memory configured to memorize the second signal corresponding to the modulated pulses, and the corresponding decoder will decode the data stream only during the reception of the non-modulated signal based on the memorized second signal.

In an embodiment, the controller is configured to activate the decoder intended to decode the data stream according to a detected protocol and to disable the other decoders.

In another aspect, a tag is proposed including the integrated circuit.

BRIEF DESCRIPTION OF THE DRAWINGS

Other features and advantages of the present invention will appear from the following description, given only by way of examples and in view of the following drawings in which.

DETAILED DESCRIPTION OF ILLUSTRATIVE EMBODIMENTS

Embodiments of the present invention are related to the field of wireless communication, especially near field communication (NFC) and, more particularly to detecting and decoding at a multiprotocol transponder or tag, the protocol used by a reader communicating with the transponder or tag.

Figure 1:
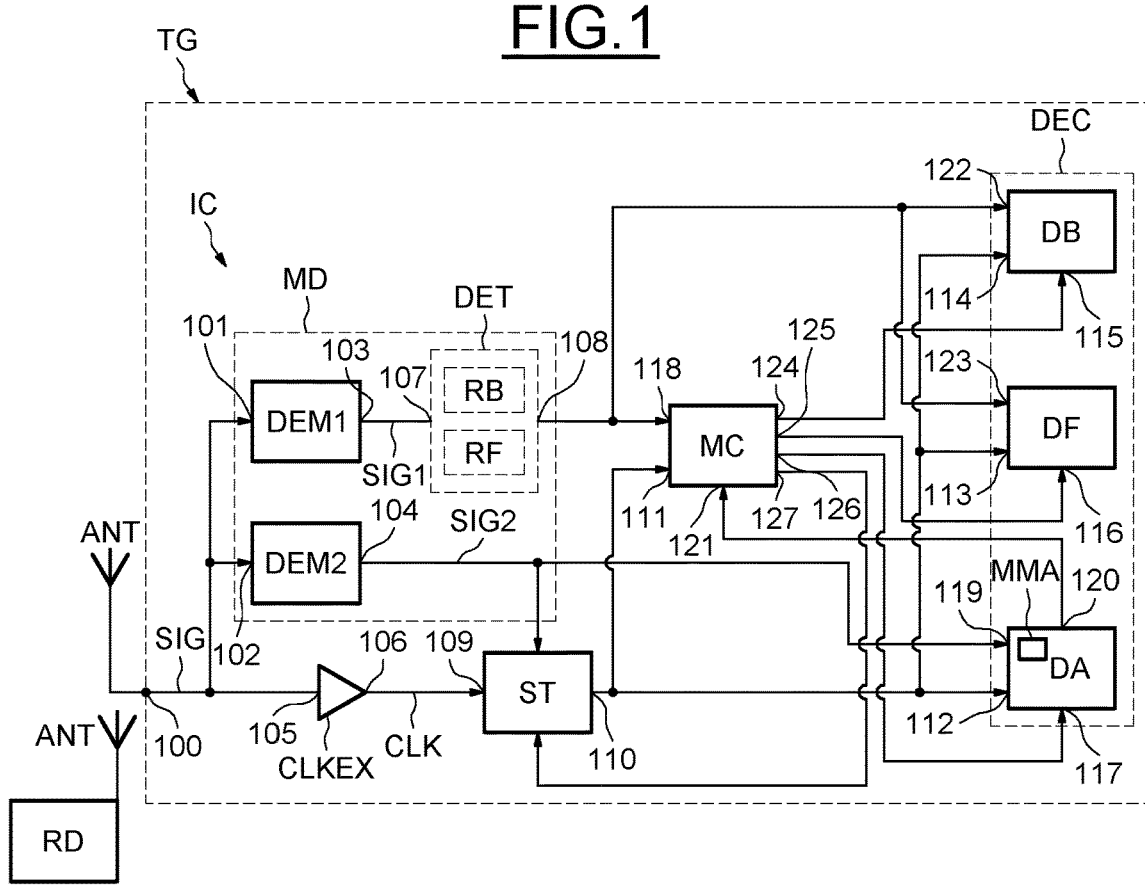
FIGS. 1 to 5 schematically illustrate different embodiments of the proposed invention.

FIG. 1 shows an integrated circuit IC of a tag TG which comprises a tag input 100 coupled to a coil antenna ANT of the tag TG. The coil antenna ANT may be configured to receive a modulated signal SIG when the tag communicates in a contactless way with a reader RD.

The modulated signal SIG is sent to a detector MD which is configured to detect a protocol from among a group of protocols. For example, the group of protocols may include the Type A, the Type B, and the Type F protocols. The modulated signal SIG is then sent to a decoder circuit DEC which is configured to decode a data stream carried by the modulated signal SIG.

The detector MD includes a first demodulator DEM1 configured to receive the modulated signal SIG on a first detector input 101. The first demodulator DEM1 is further configured to perform an ASK demodulation of the modulated signal SIG and to deliver a first signal SIG1 at a first demodulator output 103.

In the illustrated example, the detector MD is configured to distinguish the Type B and the Type F protocols and to deliver signals on a first controller input 118 belonging to a controller MC by a detector output 108.

More precisely, the detector MD includes a first protocol detection circuit RB configured to detect a Type B protocol SOF and a second protocol detection circuit RF configured to detect a Type F protocol SOF.

Figure 4:
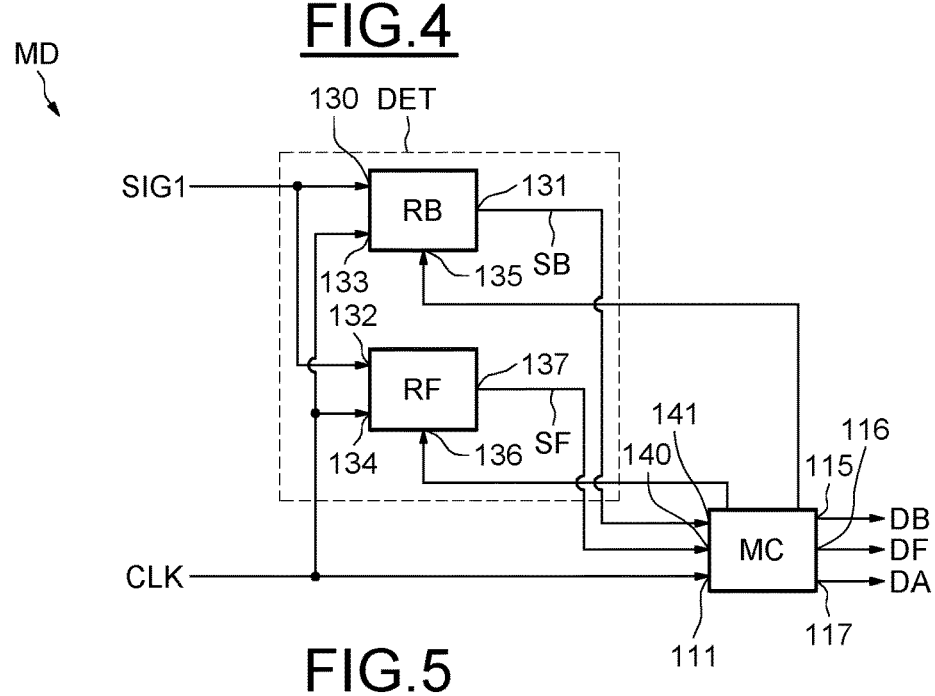

In this example, the first and second protocol detection circuits RB and RF are globally referenced by a detection circuit DET and their connections will be detailed in FIG. 4. According to a possible variant, the first and second protocol detection circuits RB and RF could be incorporated in controller MC.

The detector MD also includes a second demodulator DEM2 configured to receive the modulated signal SIG at a second detector input 102. The demodulator DEM2 is further configured to perform an OOK demodulation and to output a second signal SIG2 at a second demodulator output 104.

A decoder DEC includes a Type B decoder DB configured to receive the first signal SIG1 on a first DB decoder input 122 and decode the first signal SIG1. The decoder DEC also includes a Type F decoder DF configured to receive and decode the first signal SIG1 on a first DF input 123 and decode the first signal SIG1. The decoder DEC also includes a Type A decoder DA. The Type A decoder DA may be initially running. That is, the Type A decoder DA may be running prior to receiving the first signal SIG1. For example, initially running may indicate that the decoder DA is already running before the beginning of any protocol detection process.

In this example the Type A decoder DA is configured to receive the second signal SIG2 on a first DA input 119 which is stored by a memory MMA inside the decoder DA. The Type A decoder DA is further configured to detect the Type A protocol by attempting to decode the stored second signal SIG2. More precisely, if the Type A decoder DA successfully decodes the second signal SIG2, it indicates that the second signal SIG2 has been modulated according to Type A protocol.

On the other hand, if the Type A decoder DA cannot decode the second signal SIG2, it means that the second signal SIG2 has been modulated according to Type F protocol. The Type A decoder DA is thus configured here to notify the controller MC if the decoding has succeeded or has failed on a second controller input 121 from a first DA output 120. In the case of failure, if the circuit RF detects the Type F protocol, the Type A decoder DA will be disabled and the Type F decoder DF will be activated to decode the first signal SIG1.

According to a possible variant, detector MD may include a third protocol detection circuit coupled to the second demodulator DEM2 and to the Type A decoder DA. The third protocol detection circuit may be configured to receive the second signal SIG2 and to detect the beginning of a frame of the Type A protocol. The third detection circuit may also be configured to determine the duration of the non-modulated signal in order to distinguish between the Type A and the Type F protocol.

For example, the duration of the non-modulated signal for the Type A protocol when the first data bit is '0' at a rate of 106 kbps is about 96 divided by the carrier frequency (96/fc) and the duration of the non-modulated signal for Type F protocol at a rate of 212 kbps is about 32 divided by the carrier frequency (32/fc).

If the third detection block detects the Type A protocol, the third block sends the second signal SIG2 to the Type A decoder DA to decode the second signal SIG2. The Type A decoder DA may be initially running as previously described. That is, the Type A decoder DA may be initially enabled to decode the second signal SIG2.

The controller MC is configured to send signals to a second DB input 115 of the Type B decoder DB from a first controller output 124, to a second DF input 116 of the Type F decoder DF from a second controller output 125, and to a second DA input 117 of the Type A decoder DA from a third controller output 126.

The modulated signal SIG is also sent to a clock input 105 belonging to a clock extractor CLKEX which is configured to extract timing information from the modulated signal SIG. The clock extractor CLKEX is further configured to deliver a clock signal CLK at a clock output 106.

The clock signal CLK is sent to a blocking input 109 of the blocking circuit ST which is configured to either deliver the same clock signal CLK at a forwarded clock signal output 110 or stop the clock signal. The clock signal CLK clocks the decoding process of the Type B decoder DB, the Type F decoder DF, and the Type A decoder DA using a first clock decoder input 114, a second clock decoder input 113, and a third clock decoder input 112 respectively as well as the controller MC on a clock controller input 111.

Figure 2:
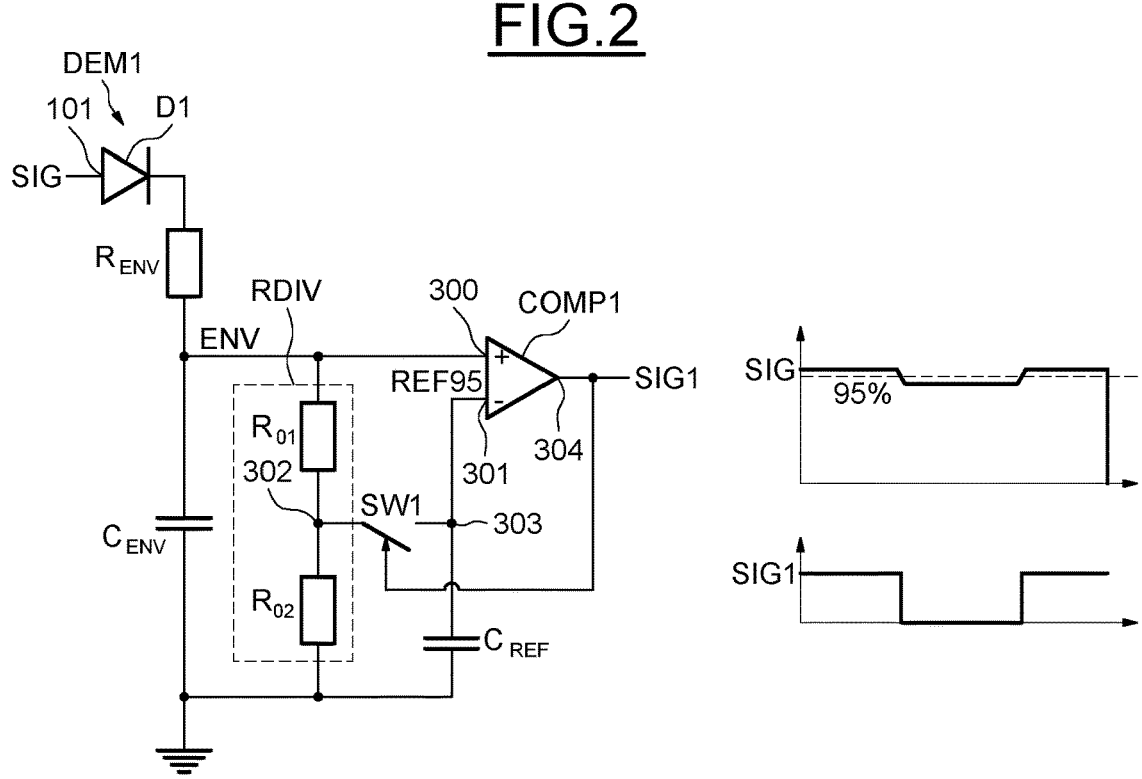

FIG. 2 illustrates detailed architecture of an implementation of a demodulator in accordance with an embodiment of the invention. The demodulator of FIG. 2 may be a specific implementation of other embodiment demodulators described herein, such as the first demodulator DEM1 of FIG. 1, for example. The first demodulator DEM1 as illustrated in FIG. 2 is an ASK modulation detector. The first demodulator DEM1 circuit includes the first detector input 101 for receiving the modulated signal SIG.

The first demodulator DEM1 further includes a first group of components including a first resistor $R_{ENV}$, a first diode D1, and a first capacitor $C_{ENV}$, which is configured to provide an envelope signal ENV. The signal ENV is then sent on a positive input 300 of a comparator COMP1.

The first demodulator DEM1 also includes a second group of components including a second resistor $R_{01}$ and a third resistor $R_{02}$ which form a resistor divider RDIV, a second capacitor $C_{REF}$ and a first switch SW1 connected between midpoint 302 of the resistor divider RDIV and a terminal 303 of the second capacitor CREF.

The second group of components is configured to provide a first reference voltage REF95 which has a reference level of about 95% of non-modulated level of the signal ENV. The first reference voltage REF95 is set to a suitable high level so that the first demodulator DEM1 can detect a modulation according to the three protocols Type A, Type B, and Type F.

The second capacitor $C_{REF}$ buffers the first reference voltage REF95 which will be used in case the first switch SW1 is opened. The first reference voltage REF95 is sent on a negative input 301 of the comparator COMP1.

Now referring to the right portion of FIG. 2, if the amplitude of the modulated signal SIG drops below the first reference voltage REF95, the comparator COMP1 changes state and delivers the first signal SIG1 at a low level which opens the first switch SW1. Hence, due to the use of the second capacitor CREF, the comparator COMP1 continues to compare the signal ENV to the reference voltage REF95. The low level of the first signal SIG1 may indicate that the modulation is an ASK modulation.

Once the amplitude of the modulated signal SIG becomes greater than the amplitude of the first reference voltage REF95, the comparator COMP1 changes state again and delivers the first signal SIG1 at a high level, which makes the switch SW1 closed.

Figure 3:
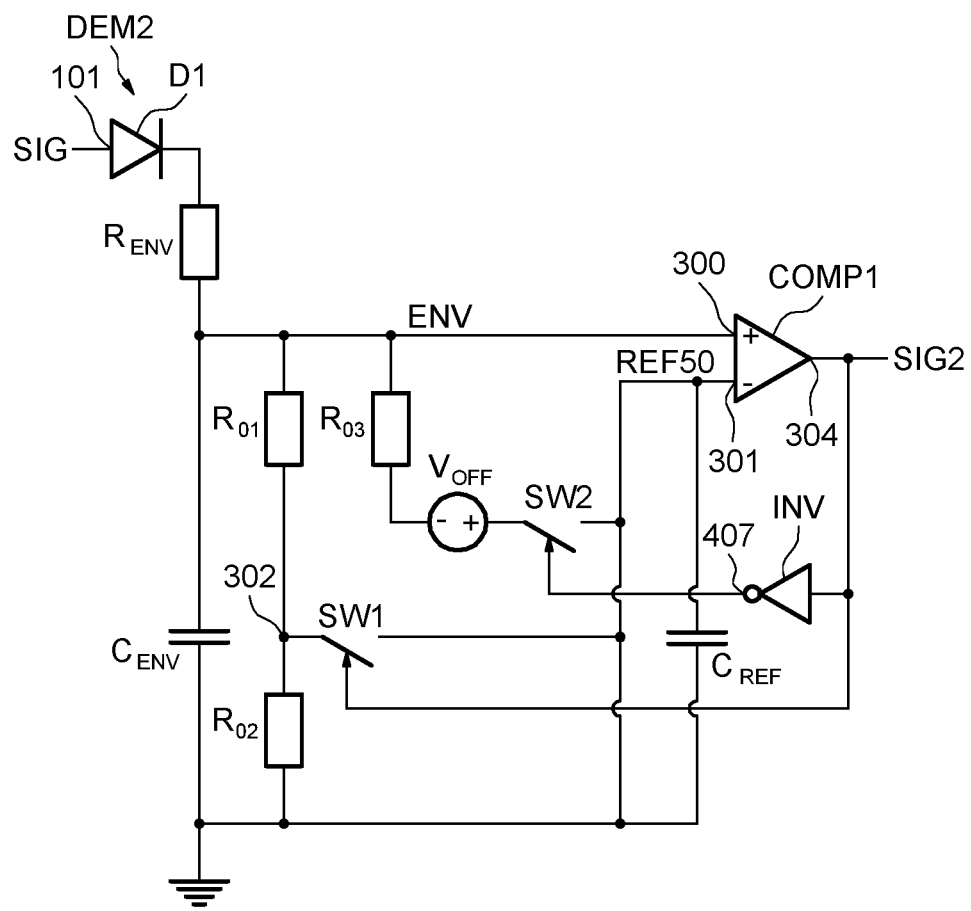
Figure 3:
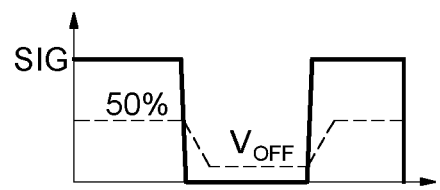
Figure 3:

FIG. 3 shows the detailed architecture of an implementation of a demodulator in accordance with an embodiment of the invention. The demodulator of FIG. 3 may be a specific implementation of other embodiment demodulators described herein, such as the second demodulator DEM2 of FIG. 1, for example. The second demodulator DEM2 as illustrated in FIG. 3 is an OOK modulation detector, e.g., as known in the art.

The second demodulator DEM2 includes the components introduced above and some additional components. Thus, the same references are kept to facilitate the comprehension.

It includes, in addition an inverter INV, a fourth resistor $R_{03}$ connected in series with a voltage source $V_{OFF}$ configured to generate a DC voltage. For example, the DC voltage may be few tens of millivolts.

A second reference voltage REF50, which represents here a first threshold of the second demodulator DEM2, is sent to the negative input 301 of the comparator COMP1. The second demodulator DEM2 also includes a second switch SW2 controlled by an inverter output 407 of the inverter INV.

Now referring to the bottom portion of FIG. 3, if the amplitude of the modulated signal SIG drops below the second reference voltage REF50, the comparator COMP1 changes state and delivers the second signal SIG2 at the low level which opens the first switch SW1 and closes the second switch SW2. The low level of the second signal SIG2 may indicate that the modulation is an OOK modulation.

As the second switch SW2 is turned on, the second reference voltage REF50 varies according to the amplitude of the signal ENV. In this case the second reference voltage REF50 represents a second threshold that varies according to the amplitude of the signal ENV.

Together, the fourth resistor $R_{03}$ and the second capacitor $C_{REF}$ provide a time constant. The source voltage $V_{OFF}$ permits that the second reference voltage REF50 stays above the value of the amplitude of the signal ENV even if the input signal SIG goes to zero.

The second reference voltage REF50 is set lower than the reference voltage REF95 at a suitable level which assures that modulation according to Type B protocol is not detected and modulation according to Type A protocol is detected. In some cases, modulation according to the Type F protocol may also be detected at the second reference voltage REF50.

Once the amplitude of the modulated signal SIG starts to rise, the rising edge is detected. The comparator COMP1 changes state and delivers the second signal SIG2 at a high level.

FIG. 4 illustrates a schematic diagram of the first protocol detection circuit RB and the second protocol detection circuit RF connected to the controller MC in accordance with an embodiment of the invention.

The first protocol detection circuit RB is configured to receive the first signal SIG1 sent by the first demodulator DEM1 at a first protocol detection input 130. The first protocol detection circuit RB is further configured to deliver a first detection signal SB to a first detection signal input 141 of the controller MC from a first detection signal output 131.

The second protocol detection circuit RF is configured to receive the signal SIG1 sent by the first demodulator DEM1 at a second protocol detection input 132. The second protocol detection circuit RF is further configured to deliver a second detection signal SF to a second detection signal input 140 of the controller MC from a second detection signal output 137. The clock signal CLK clocks the detection process of the first and second protocol detection circuits RB and RF using a first clock signal input 133 and a second clock signal input 134 as well as the controller MC using the clock controller input 111.

Figure 5:
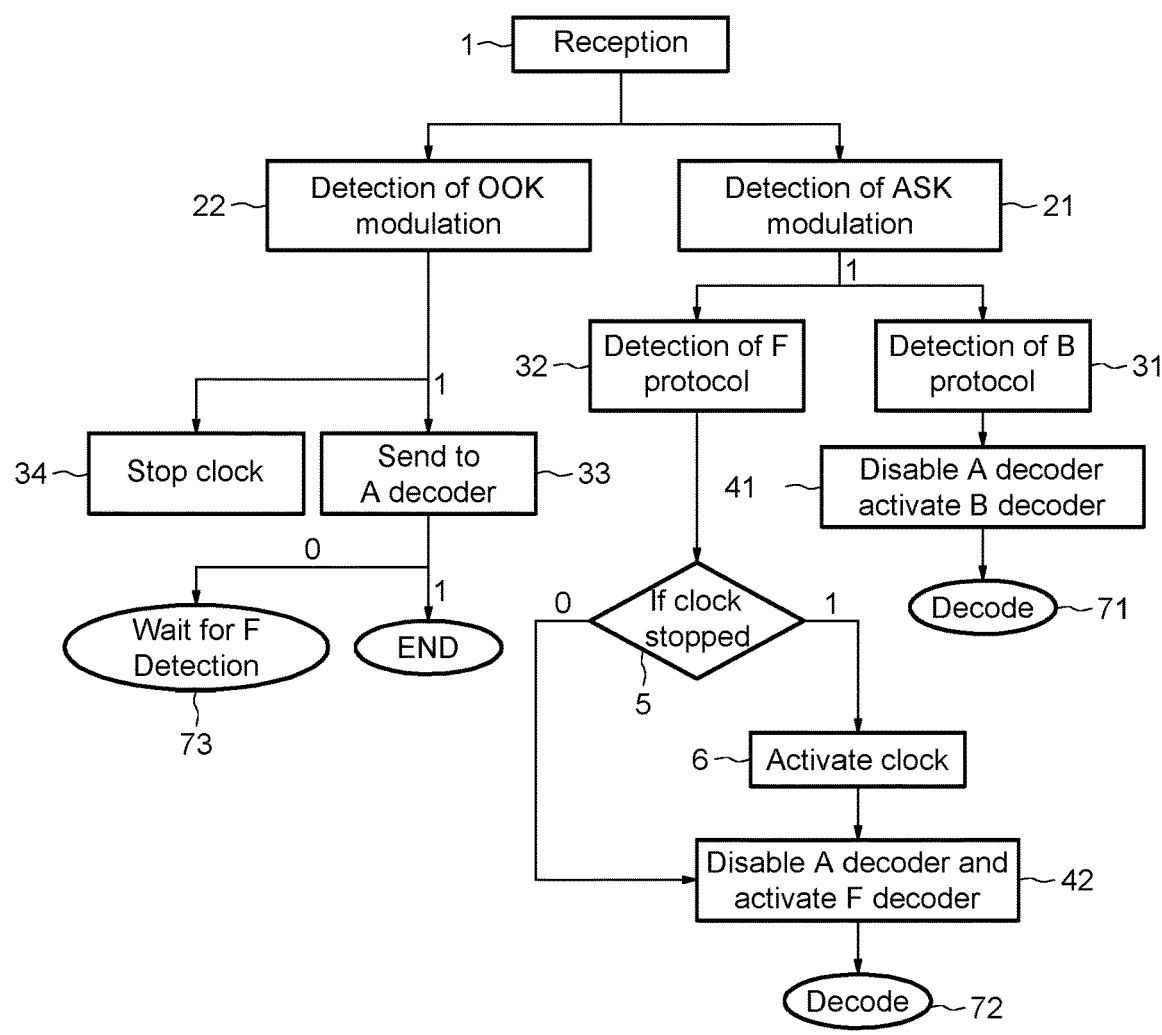

FIG. 5 illustrates a flow diagram of a method of decoding a data stream carried by a modulated signal in accordance with an embodiment of the invention.

Step 1 includes the reception of the modulated signal SIG by an antenna coil tag, which is modulated according to one protocol from among a group of protocols. For example, the group of protocols may include the Type A, the Type B, and the Type F protocols.

Following step 1, step 21 and 22 are performed. For example, step 21 and step 22 may be performed in parallel (i.e., at the same time). In step 21, the modulated signal SIG is sent to the first demodulator DEM1 to detect if there is an ASK modulation. If an ASK modulation is detected by the demodulator DEM1, the first signal SIG1 is sent to the first protocol detection circuit RB to detect, in step 31, if the modulated signal is modulated according to the Type B protocol. In step 41, the Type B decoder DB is activated and the Type A decoder DA is disabled in case the Type B protocol has been detected. The decoder circuit decodes the data stream in step 71.

In parallel, the first signal SIG1 is stored in a flip-flop or a latch and will be sent to the second protocol detection circuit RF to detect, in step 32, if the modulated signal is modulated according to the Type F protocol. If the second protocol detection circuit RF detects F protocol, the controller MC checks if the clock signal CLK is stopped in step 5. If the clock signal CLK is stopped, the controller MC disables, in step 6, the blocking circuit ST to allow the clock signal CLK to run again. The Type F decoder DF is then activated in step 42 and the Type A decoder DA is disabled. Thus, the decoder circuit will decode the data stream in step 72. If the clock signal CLK isn't stopped, the Type F decoder DF is activated in step 42 to decode in step 72 the data stream.

In step 22, the modulated signal SIG is sent to the second demodulator DEM2 to detect if there is an OOK modulation. If an OOK modulation is detected, the second signal SIG2 is sent to the decoder DA in step 33 to decode the second signal which is stored by the memory MMA which can be a flip-flop or a latch. In parallel, the blocking circuit ST stops the clock signal in step 34 until the reception of a non-modulated signal. Once the non-modulated signal is received, the blocking circuit ST doesn't stop the clock signal and the stored second signal SIG2 will be decoded.

If the decoder cannot decode the data stream, it may indicate that the modulated signal SIG has been modulated according to Type F protocol. The system will wait in step 73 for the detection of Type F protocol by the second protocol detection circuit RF in step 32. Then, if Type F protocol has been successfully detected, the clock signal is no longer stopped during the modulated pulses, as explained in step 6.

What is claimed is:

1. A method for decoding a data stream carried by a modulated signal, the method comprising:
   receiving the modulated signal, the modulated signal being modulated according to a protocol belonging to a group of protocols comprising a first protocol, a second protocol, and a third protocol;
   extracting a clock signal from the modulated signal;
   detecting the protocol by
      Performing an on-off keying (OOK) demodulation on the modulated signal to generate an OOK-demodulated signal,
      in response to the OOK-demodulated signal having a "o" state, stopping the clock signal and detecting the protocol, and
      maintaining the clock signal during reception of a non-modulated signal; and
   decoding the data stream according to the detected protocol using the clock signal.

2. The method according to claim 1, wherein detecting the protocol further comprises determining a duration of a non-modulated signal.

3. The method according to claim 1, wherein detecting the protocol further comprises:
   performing an amplitude-shift keying (ASK) demodulation on the modulated signal to generate an ASK-demodulated signal; and
   detecting the protocol using both theOOK-demodulated signal and the ASK-demodulated signal.

4. The method according to claim 1, wherein:
   the OOK-demodulated signal is in a "1" state when a level of the modulated signal is greater than a first threshold; and
   the OOK-demodulated signal is in the "0" state when the level of the modulated signal is lower than a second threshold.

5. The method according to claim 1, wherein detecting the protocol further comprises:
   in response to the OOK-demodulated signal having a "0" state, decoding the OOK-demodulated signal according to the first protocol using a first decoder; and
   in response to successful decoding of the OOK-demodulated signal by the first decoder, detecting the protocol.

6. A method for decoding a data stream carried by a modulated signal, the method comprising:
   receiving the modulated signal, the modulated signal being modulated according to a protocol belonging to a group of protocols comprising a Type A protocol of the ISO/IEC14443 standard, a Type B protocol of the ISO/IEC14443 standard, and a Type F protocol of the JIS.X.6319 standard;
   extracting a clock signal from the modulated signal;
   detecting the protocol by
      performing an on-off keying (OOK) demodulation on the modulated signal to generate an OOK-demodulated signal,
      in response to the OOK-demodulated signal having a "0" state, stopping the clock signal and detecting that the protocol is the Type A protocol,
      maintaining the clock signal during reception of a non-modulated signal; and
   decoding the data stream according to the detected protocol using the clock signal.

7. The method according to claim 6, wherein detecting to the protocol further comprises:
   performing an amplitude-shift keying (ASK) demodulation on the modulated signal to generate an ASK-demodulated signal; and
   detecting the protocol using both the OOK-demodulated signal and the ASK-demodulated signal, wherein transitions between a "1" state and the "0" state of theOOK-demodulated signal are a result of the modulated signal being modulated according to either the Type A protocol or the Type F protocol.

8. The method according to claim 7, wherein detecting the protocol further comprises:
   analyzing the ASK-demodulated signal to distinguish between the Type B protocol and the Type F protocol.

9. The method according to claim 6, wherein:
the OOK-demodulated signal has a "1" state when a level of the modulated signal is greater than a first threshold; and
the OOK-demodulated signal has the "0" state when the level of the modulated signal is lower than a second threshold.

10. The method according to claim 6, wherein detecting the protocol comprises determining a duration of the non-modulated signal to distinguish between the Type A protocol and the Type F protocol.

11. The method according to claim 6, wherein detecting the protocol further comprises resuming forwarding of the clock signal in response to detecting that the protocol is the Type F protocol.

12. The method according to claim 6, further comprising activating a Type A decoder prior to detecting the protocol, wherein
decoding the data stream comprises decoding the data stream using a selected decoder of a plurality of decoders comprising
the Type A decoder, wherein the Type A decoder is configured to decode the data stream according to the Type A protocol,
a Type B decoder configured to decode the data stream according to the Type B protocol, and
a Type F decoder configured to decode the data stream according to the Type F protocol.

13. The method according to claim 6, further comprising:
after stopping the clock signal and in response to detecting that the protocol is the Type A protocol, storing a demodulated signal corresponding to the modulated pulses; and
decoding the data stream based on the stored demodulated signal using the selected decoder during reception of a non-modulated signal.

14. The method according to claim 12, wherein decoding the data stream according to the detected protocol comprises activating the selected decoder while disabling all remaining decoders of the plurality of decoders.

15. An integrated circuit for decoding a data stream carried by a modulated signal comprising:
a wireless receiver configured to receive the modulated signal, the modulated signal being modulated according to a protocol belonging to a group of protocols selected from the group consisting of a Type A protocol of the ISO/IEC14443 standard, a Type B protocol of the ISOREC14443 standard, and a Type F protocol of the JIS.X.6319 standard;
a clock extractor coupled to the wireless receiver and configured to extract a clock signal from the modulated signal;
a detector coupled to the wireless receiver and configured to configured to detect the protocol by performing an on-off keying (OOK) demodulation on the modulated signal to generate an OOK-demodulated signal, and detecting that the protocol is the Type A protocol in response to the OOK-demodulated signal having a "0" state;
a blocking circuit coupled to the clock extractor and configured to stop the clock signal in response to the OOK-demodulated signal having a "0" state and maintain the clock signal during reception of a non-modulated signal; and
a decoder configured to decode the data stream according to the detected protocol using the clock signal.

16. The integrated circuit according to claim 15, wherein the detector comprises:
an amplitude-shift keying (ASK) demodulator configured to perform an ASK demodulation on the modulated signal to generate an ASK-demodulated signal comprising transitions between "1" state and the "0" state; and
an OOK demodulator configured to perform the OOK demodulation on the modulated signal to generate OOK-demodulated signal comprising transitions between the "1" state and the "0" state;
wherein the transitions between the "1" state and the "0" state of the OOK-demodulated signal are a result of the modulated signal being modulated according to either the Type A protocol or the Type F protocol; and
wherein the detector is further configured to detect the protocol using both the OOK-demodulated signal and the ASK-demodulated signal.

17. The integrated circuit according to claim 16, wherein the detector is further configured to detect the protocol by analyzing the ASK-demodulated signal to distinguish between the Type B protocol and the Type F protocol.

18. The integrated circuit according to claim 15, wherein:
the OOK-demodulated signal has the "1" state when a level of the modulated signal is greater than a first threshold; and
the OOK-demodulated signal has the "0" state when the level of the modulated signal is lower than a second threshold.

19. The integrated circuit according to claim 15, wherein the detector is further configured to detect the protocol by determining a duration of the non-modulated signal to distinguish between the Type A protocol and the Type F protocol.

20. The integrated circuit according to claim 18, wherein the blocking circuit is further configured to resume forwarding of the clock signal in response to detecting that the protocol is the Type F protocol.

21. The integrated circuit according to the claim 15, further comprising:
a controller configured to activate a Type A decoder prior to detection of the protocol,
wherein the decoder comprises a plurality of decoders and is further configured to decode the data stream according to the detected protocol using a selected decoder of the plurality of decoders; and
wherein the plurality of decoders comprises
the Type A decoder, wherein the Type A decoder is configured to decode the data stream according to the Type A protocol;
a Type B decoder configured to decode the data stream according to the Type B protocol; and
a Type F decoder configured to decode the data stream according to the Type F protocol.

22. The integrated circuit according to claim 21, wherein:
the Type A decoder comprises a memory configured to store a demodulated signal corresponding to the modulated pulses; and
wherein the detector is further configured to decode the data stream based on the stored demodulated signal using the selected decoder during reception of a non-modulated signal.

23. The integrated circuit according to claim 21, wherein the controller is further configured to activate the selected decoder while disabling all remaining decoders of the plurality of decoders.

* * * * *

UNITED STATES PATENT AND TRADEMARK OFFICE
CERTIFICATE OF CORRECTION

PATENT NO. : 10,853,593 B2  
APPLICATION NO. : 16/443227  
DATED : December 1, 2020  
INVENTOR(S) : Maksimiljan Stiglic et al.

Page 1 of 1

It is certified that error appears in the above-identified patent and that said Letters Patent is hereby corrected as shown below:

In the Claims

In Column 9, Line 65, Claim 1, delete "Performing" and insert --performing--.

In Column 11, Line 48, Claim 15, delete "ISOREC14443" and insert --ISO/IEC14443--.

In Column 12, Line 38, Claim 21, delete "to the claim 15" and insert --to claim 15--.

Signed and Sealed this  
Eleventh Day of May, 2021

Drew Hirshfeld  
*Performing the Functions and Duties of the*  
*Under Secretary of Commerce for Intellectual Property and*  
*Director of the United States Patent and Trademark Office*